United States Patent [19]

Trottier et al.

[11] Patent Number: 4,747,070
[45] Date of Patent: May 24, 1988

[54] RECONFIGURABLE MEMORY SYSTEM

[75] Inventors: Robert R. Trottier; James B. MacDonald, both of Lowell; John M. Martins, Wilmington, all of Mass.; Dennis J. Kayser, Hudson, N.H.

[73] Assignee: Wang Laboratories, Inc., Lowell, Mass.

[21] Appl. No.: 568,997

[22] Filed: Jan. 9, 1984

[51] Int. Cl.[4] .............................................. G06F 3/00
[52] U.S. Cl. ..................................................... 364/900
[58] Field of Search ... 364/200 MS File, 900 MS File

[56] References Cited

U.S. PATENT DOCUMENTS

| | | | |
|---|---|---|---|
| 3,686,640 | 8/1972 | Anderson et al. | 364/900 |
| 3,693,165 | 9/1972 | Reiley et al. | 364/200 |
| 3,820,078 | 6/1974 | Curley et al. | 364/200 |
| 4,093,995 | 6/1978 | Smith et al. | 364/900 |
| 4,157,587 | 6/1979 | Joyce et al. | 364/200 |
| 4,162,534 | 7/1979 | Barnes | 364/900 |
| 4,349,871 | 9/1982 | Lary | 364/200 |
| 4,382,278 | 5/1983 | Appelt | 364/200 |
| 4,410,944 | 10/1983 | Kronies | 364/200 |

*Primary Examiner*—Gareth D. Shaw
*Assistant Examiner*—Christina Eakman
*Attorney, Agent, or Firm*—Michael H. Shanahan; Gordon E. Nelson

[57] ABSTRACT

Apparatus and method for reconfiguring a memory in a data processing system to increase the rate of information transfer between system memory and processor. The system memory is comprised of a plurality M of memory banks, each having a separate data output path. In a first configuration a memory controller addresses the memory banks sequentially to read from one address location at a time. The memory is reconfigured by an address translator providing addresses addressing M banks in parallel, so that M locations are read in each read operation, and a bus reconfiguration multiplexer which reconfigures the bank output busses in parallel and selects one or more bank output busses as the memory output to the system processor. In a further embodiment, a cache is connected in parallel with the parallel bank outputs for storing information appearing upon the non-selected bank output busses paths for subsequent transfer to the memory output in a subsequent reading from memory of previously read but non-selected information.

8 Claims, 2 Drawing Sheets

RECONFIGURABLE MEMORY SYSTEM

FIELD OF THE INVENTION

The present invention relates to a memory system for a digital data processing system and, more particularly, to a reconfigurable memory system for a digital computer system.

DESCRIPTION OF THE PRIOR ART

A recurring problem in the design of computer and data processing systems is the provision of a means or path by which the capabilities of a system, such as memory capacity or speed of system operation, may be enhanced without a major modification to or rebuilding of the system.

As is well known in the prior art, system memory capacity is readily expandable without significant alterations to the system. In many systems, memory may be expanded by simply inserting additional memory circuit boards as required.

The enhancement of system operating speed is more difficult, however, in that the factors determining system operating speed, that is, the rate at which the system can operate upon data and instructions, are largely determined by the design of the system memory and processing elements. The system processor and memory elements are integral parts of the system and a modification to either generally results in significant modifications to the system as a whole. For example, system speed may be limited by the rate at which the system processor can accept and operate upon data and instructions. An increase in processor speed may require the installation of a different processor, which may in turn require modification of the operating system programs, that is, the supervisory programs controlling overall system operation.

The primary limitation upon system operating speed, however, is most commonly the rate at which instructions and data may be transferred from memory to the system processor. Memory to processor transfer rate is most commonly enhanced by either installing a higher speed memory or by imposing a high speed complex cache memory system between the system memory and processor. The substitution of a high speed memory or the addition of a cache memory, however, frequently requires significant modifications to the processor and system memory interfaces and often requires corresponding modifications or additions to the operating system programs.

The present invention provides a means and method for enhancing the speed of operation of a data processing system by increasing the system memory to processor transfer rate while avoiding the problems and limitations of the prior art as described above.

SUMMARY OF THE INVENTION

The present invention relates to apparatus and method for reconfiguring a memory in a data processing system to enhance the rate of information transfer between system memory and processor, thereby enhancing the speed of operation of the system without requiring significant modification of the system.

In the present embodiment of the invention, the system memory is comprised of a plurality of memory banks, each bank being one or more words in width and having a separate data output path.

In a first, lower speed configuration, a memory controller addresses the memory banks as a sequential memory to read from one address location at a time and the output data paths of the memory banks are configured into a single, one bank wide data path to the system processor. If, for example, each bank is one word wide and N words deep and there are M memory banks, the memory appears as a sequential, one word wide by MxN words deep memory from which one word may be read at a time. The information transfer rate is thereby determined by the rate at a word may be read from a bank.

In a second configuration, the memory is reconfigured by the addition of an address translator means and a bus reconfiguration means. The address translator means provides addresses addressing M banks in parallel, so that M locations are read in each read operation. The bus reconfiguration means reconfigures the bank output busses in parallel, that is, into M parallel busses, and provides a selection means, responsive to the addressing means, for providing the information appearing on a selected bank output bus as the memory output to the system processor. The memory, assuming the same example as above, is thereby reconfigured to be a parallel, M words wide by N words deep memory wherein M words may be read from the memory at a time. The information transfer rate is thereby increased over that of the sequential memory configuration.

In both the sequential and parallel configurations, the data path to the system processor, that is, both the single width path of the sequential configuration and the selection means output of the parallel configuration, comprise a direct data path from the memory to the processor. That is, a path by which information read from memory is essentially provided directly to the processor as it is read from the memory. In a yet further embodiment of the reconfigured memory, a cache path is provided, connected in parallel with the direct data path, that is, from the parallel bank outputs to selection means output, for storing information transfer rate is thereby further enhanced in that information may be accessed from the cache, which is essentially a smaller, high speed memory, rather than from the system memory.

In a still further embodiment, the data path from memory to processor may be increased in width, together with the memory output path, thereby reconfiguring the system from, for example, an 8 bit system to, for example, a 16 or 32 bit system.

It is thus an advantage to incorporate the present invention into a data processing system becuase the rate of information transfer between system memory and processor are increased, thereby enhancing system operating rate.

It is further advantageous to incorporate the present invention into a data processing system because the enhancement of data transfer and operating rate are achieved without requiring significant modification of or addition to the system.

It is thus an object of the present invention to provide an improved data processing system.

It is another object of the present invention to provide an improved, reconfigurable memory system for a data processing system.

It is yet another object of the present invention to enhance the rate of information transfer between a system memory and processor.

It is still another object of the present invention to enhance the rate of operation of a data processing system.

It is a still further object of the present invention to obtain the above objects and advantages without requiring significant modification of or addition to the data processing system.

Other objects and advantages of the present invention will be understood by those of ordinary skill in the art, after referring to the detailed description of a preferred embodiment and drawings wherein:

DESCRIPTION OF A PREFERRED EMBODIMENT

Figure 1:
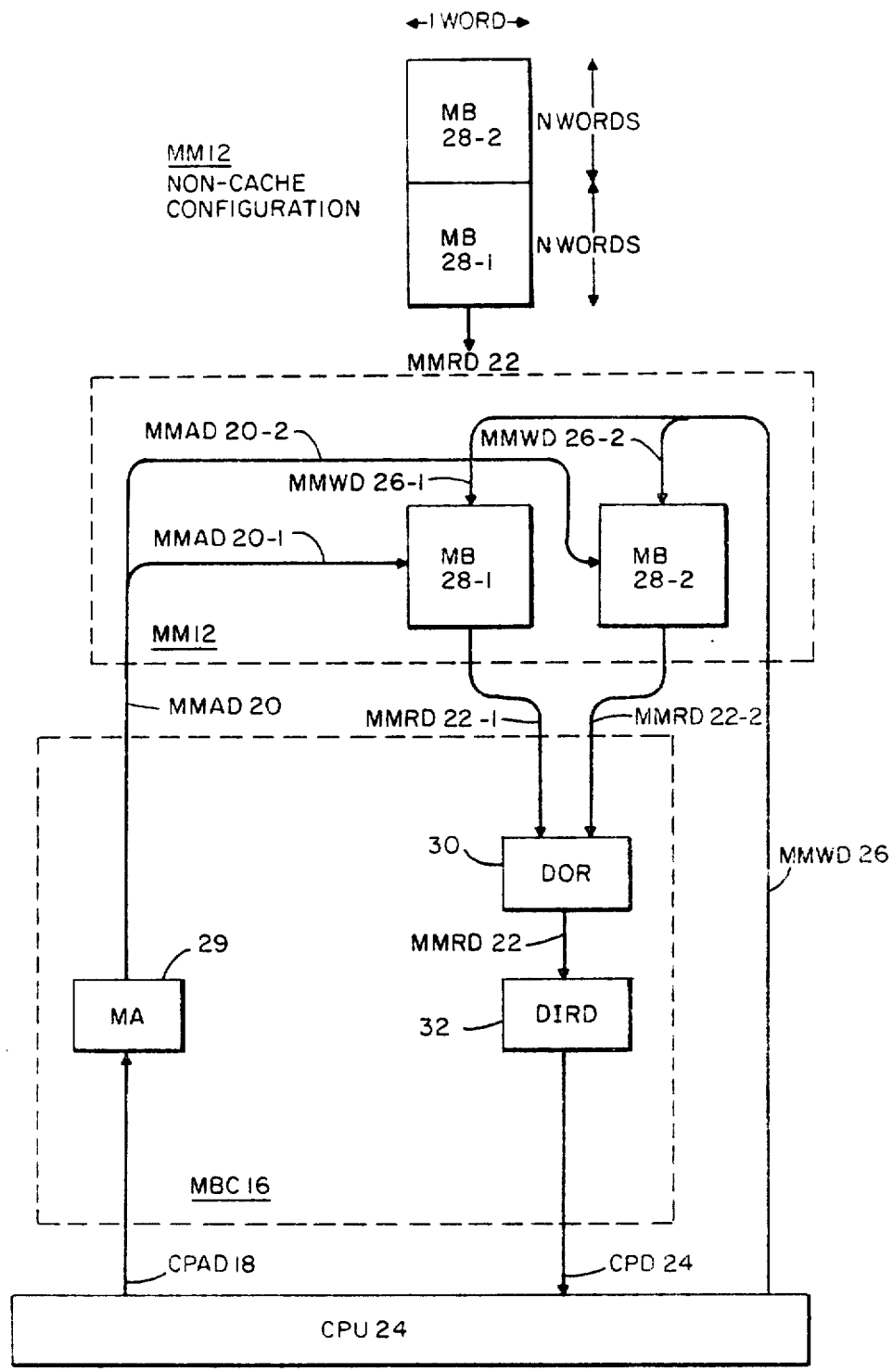
FIG. 1 is a partial block diagram of a system incorporating the reconfigurable memory in the non-cache configuration; and, FIG. 2 is a partial block diagram of a system incorporating the reconfigurable memory in the cache configuration.
Figure 2:
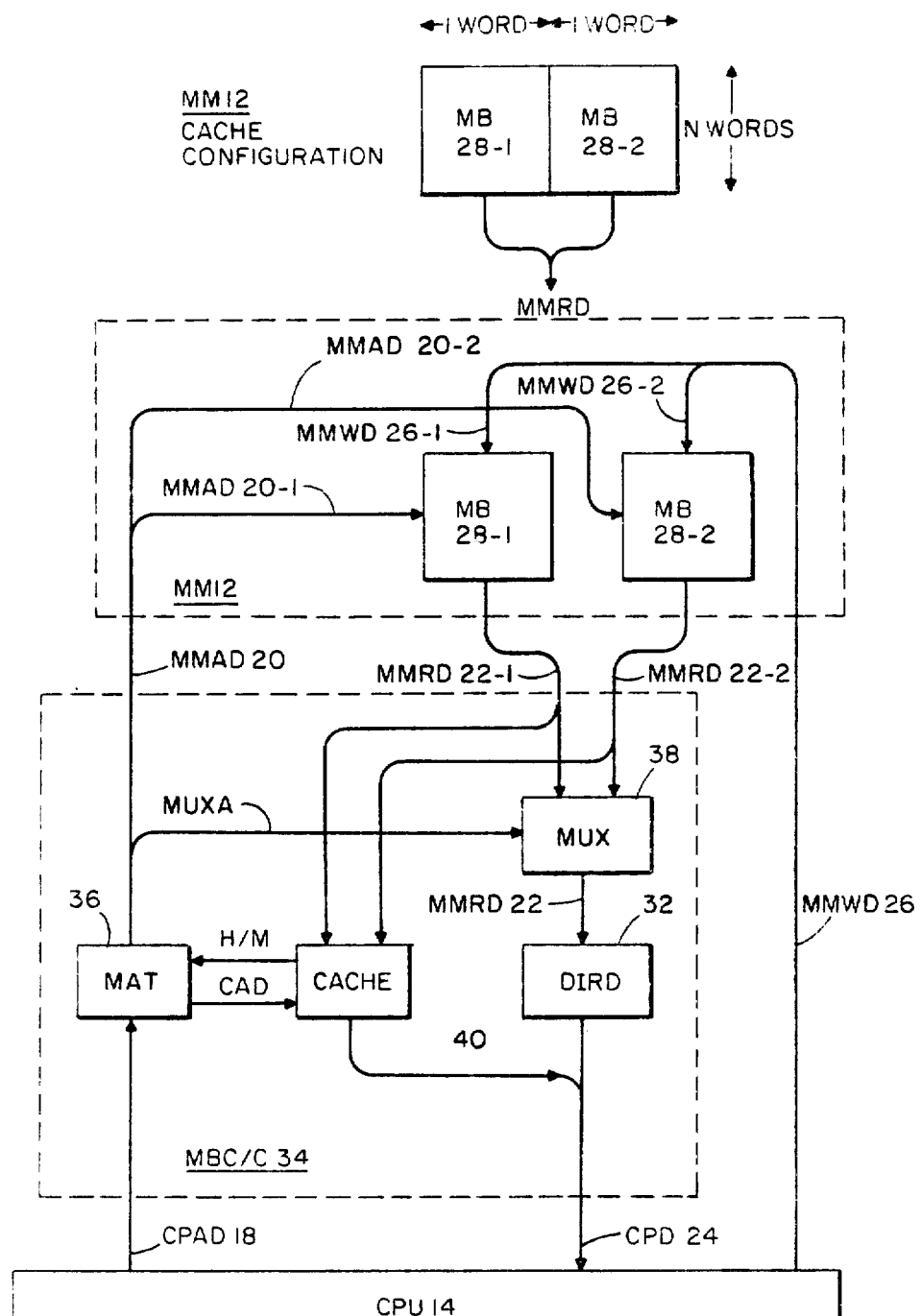

The following description presents the structure and operation of a system incorporating the cache reconfigurable memory of the present invention. The system and memory are described first in the basic, or non-cache, configuration and then as reconfigured by the cache, that is, in the cache configuration. As described above with reference to the drawings, the non-cache configuration is shown in FIG. 1 and the cache configuration in FIG. 2. FIGS. 1 and 2 may be arranged side by side to aid in illustrating the concepts described in detail below.

1. Basic Configuration

Referring first to the basic configuration shown in FIG. 1, a Computer System 10 includes a Main Memory (MM) 12 for storing data and instructions and a Central Processor Unit (CPU) 14 responsive to the instructions for performing operations on the data. Also included in Computer System 10 and connected between MM 12 and CPU 14 is a Memory and Bus Controller (MBC) 16 which controls the transfer of instructions and data between MM 12 and CPU 14.

MBC 16 is responsive to read/write addresses (CPADs) provided from CPU 14 through CPAD bus 18 to provide corresponding read/write addresses (MMADs) to MM 12 through MMAD bus 20. MM 12 and MBC 16 are respectively responsive to MMADs and CPADs to read Main Memory Read (MMRD), that is, data and instructions, from MM 12 to MBC 16 through MMRD buses 22-1 and 22-2 and corresponding Central Processor Data (CPD) from MBC 16 to CPU 14 through CPD bus 24. MM 12 and MBC 16 are similarly responsive to MMADs and CPADs to write Main Memory Write Data (MMWD) from CPU 14 to MM 12 through MMWD bus 26.

As shown in FIG. 1, MM 12 is comprised in the basic, non-cache configuration of one or more Memory Banks (MBs) 28. For purposes of illustration with respect to the following description of the cache reconfigured MM 12, MM 12 is shown in the basic configuration as containing two MBs 28, designated as MB 28-1 and MB 28-2. Each MB 28 comprises, in the present example, a one word wide by N word deep memory bank having separate input address and data paths, respectively MMAD 20-1 and MMAD 20-2 and MMWD 26-1 and MMWD 26-2, and separate output data paths, respectively MMRD 22-1 and MMRD 22-2. The input and output data paths of MB 28-1 and MB 28-2 are each one word wide.

In the present example, System 10 may be a 32 bit system, that is, each word may contain 32 bits of instruction or data information, while N may equal 262,144 words. In further example, each word stored in an MB 28 may contain 32 information bits plus 7 Error Correcting Code (ERCC) bits, or 39 bits. For purposes of clarity in the following descriptions, however, the ERCC bits and functions of MM 12 and MBC 16 will be ignored.

As shown in FIG. 1, MBC 16's MMAD output from Memory Addressing (MA) 29 through MMAD bus 20 is connected to address inputs MMAD 20-1 and MMAD 20-2 of MB 28-1 and MB 28-2 in parallel so as to provide each MBC 16 MMAD output concurrently to both MB 28-1 and MB 28-2. MA 29 is essentially a buffer, but may perform certain address translation functions. The MMADs provided from MA 29 in response to each CPAD provided from CPU 14 identify individual address locations, or words, in MB 28-1 and 28-2. Each CPAD will thereby result in the addressing of a single word in MM 12.

In the basic, non-cache configuration shown in FIG. 1, MBC 16 configures the separate one word wide data output paths MMRD 22-1 and 22-2 of MB 28-1 and 28-2 into a single one word wide output data path, MMRD 22, through Data OR (DOR) 30. DOR 30 may comprise a one word wide ORing circuit or may, for example, comprise a simple wired ORing of MMRD 22-1 and 22-2 if MB 28-1 and 28-2 are provided with tri-state or open collector output drivers. Since each MMAD provided to MM 12 by MA 29 selects a single word to be read from MM 12 in each read operation, only one corresponding output word will appear on MMRD busses 22-1 and 22-2. There will thereby be no data output conflicts in DOR 30 and the single words read from MM 12 in each operation will appear on MMRD bus 22. Words appearing on MMRD bus 22 are transferred through Direct Read Data (DIRD) path 32, essentially a buffer operation, to CPD bus 24 and CPU 14.

In the non-cache configuration, therefore, MB 28-1 and MB 28-2 are functionally configured in sequence by MBC 16, as regards both addressing and data output, so that MM 12 functionally comprises a one word wide by $2 \times N$ word deep memory. A diagrammic illustration of the non-cache, sequential configuration of MB 28-1 and 28-2 as a one word wide by $2 \times N$ word deep memory is presented in FIG. 1 above MM 12.

All reads of words from MM 12 by CPU 14 in the basic, non-cache configuration are therefore of single words and the data transfer rate between MM 12 and CPU 14 is thereby determined by the rate at which words may be read from MM 12.

It should be noted that because CPU 14 operates, in the present example, upon the basis of single words, all writes of data from CPU 14 to MM 12 will usually be of single words. Data input paths MMWD 26-1 and MMWD 26-2 of, respectively, MB 28-1 and 28-2 are therefore connected in parallel from MMWD bus 26 to comprise a single one word wide data path into MB 28-1 and MB 28-2.

It should be further noted that, in the basic configuration, individual word locations in MM 12, that is, in MB 28-1 and MB 28-2, may be assigned and addressed sequentially. In an alternate embodiment, or as described below with regard to the cache reconfiguration of MM 12, odd address locations may be assigned in, for example, MB 28-1 while even address locations are assigned in MB 28-2.

2. Cache Configuration

Referring now to FIG. 2, Computer System 10 is shown in the cache configuration. As described above with reference to the basic configuration, System 10 includes CPU 14 and MM 12. MM 12, however, contains two, or a multiple of two, MB 28s rather than one or more MB 28s and MBC 16 has been replaced by Memory Bus Controller/Cache (MBC/C) 34.

As illustrated by a comparison of FIGS. 1 and 2, and described further below, the replacement of MBC 16 by MBC/C 34 results in the reconfiguration by MBC/C 34 of the MM 12 data output paths, that is, MMRD 22-1 and MMRD 22-2. The reconfiguration of MMRD 22-1 and 22-2 by MBC/C 34 separates MMRD 22-1 and 22-2 into separate, parallel one word wide data output paths from, respectively, MB 28-1 and MB 28-2, so that the data path from MM 12 to MBC/C 34 is two words wide. As will be described further below in association with a further, more detailed description of the elements of MBC/C 34, MMRD 22-1 and 22-2 are reconfigured into separate parallel paths by Multiplexer (MUX) 38, which replaces MBC 16's DOR 30.

MBC/C 34 further performs a translation operation on the CPADs provided from CPU 14 so as to provide corresponding MMADs suitable to the altered configuration of MM 12. The configurations and functions of all other data and address paths remain unchanged from the non-cache configuration, as do the internal operations and the interfaces of the MB 28s and CPU 14.

As described above with refeence to the non-cache configuration, CPU 14 operates on the basis on single words and, accordingly, the CPAD addresses provided to MBC/C 34 by CPU 14 refer to single words. Any particular single word, however, may be regarded as a member of an odd/even pair of words, that is, a pair of words wherein one word of the pair is identified by an odd address and the other word of the pair is identified by the adjacent even address, or the reverse. The addresses of the two words of such a pair will differ by one bit, that is, an odd/even bit identifying a particular word as the odd or even word of a pair.

The address translation operation performed by MBC/C 34 is performed by Memory Address Translator (MAT) 36, which replaces MA 29 of MBC 16. MAT 36 transforms CPAD single word references received from CPU 14 into MMADs referring to corresponding odd/even pairs of words by effectively discarding the odd/even bit of the CPADs. A CPAD provided by CPU 14 will thereby result in an MMAD referencing an odd/even pair of words wherein one word of the pair is the word referred to by the original CPAD and the other word of the pair is the corresponding odd or even word of the pair.

As previously described, MM 12 will, in the cache configuration, contain at least one pair of MB 28s, for example, MB 28-1 and MB 28-2, and may contain several pairs of MB 28s, depending upon the address space defined by addresses CPAD and MMAD. In the cache configuration, address locations within MM 12, that is, within each MB 28-1 and 28-2 pair, are assigned so that all odd address locations reside in, for example, MB 28-1 and all even address locations reside in corresponding address locations in MB 28-2.

As previously described with respect to MBC 16, MBC/C 34's MMAD output from MAT 36 through MMAD bus 20 is connected to address inputs MMAD 20-1 and 20-2 of MB 28-1 and 28-2 in parallel so as to provide each MBC/C 34 MMAD output concurrently to both MB 28-1 and 28-2. Each MMAd odd/even pair address provided by MBC/C 34 will thereby address corresponding parallel locations in MB 28-1 and 28-2 so that the corresponding odd/even pair of words will appear concurrently and in parallel upon MM 12 data output buses MMRD 22-1 and 22-2.

Each MB 28-1 and 28-2 pair are thereby functionally reconfigured by MBC 16, as regards both addressing and data output paths, from a sequential, one word wide configuration to a parallel, two word wide configuration. The replacement of MBC 16 by MBC/C 34 thereby reconfigures MM 12 from a one word wide by 2xN word deep memory wherein each read operation provides one word to a two word wide by N word deep memory wherein each read operation provides an output of two words in parallel. MBC/C 34 thereby doubles the output data rate of MM 12 with respect to the non-cache configuration of MBC 16 shown in FIG. 1. A diagrammatic illustration of the parallel, cache configuration of MB 28-1 and 28-2 as a two word wide by N word deep memory is presented in FIG. 2 above MM 12.

In addition to reconfiguring MM 12 as just described, MBC/C 34 further provides, as described in further detail below, a dual data path from MM 12 to CPU 14. The first branch of the path is a direct data path for transferring single words directly from either MMRD 22-1 or MMRD 22-2 to CPD bus 24 and corresponds to the Direct Read Data path comprising DOR 30 and DIRD 32 of MBC 16. The second path, connected in parallel with the direct data path, includes a cache memory for storing words in anticipation of the needs of CPU 14.

Referring first to the direct data path, the DOR 30 of MBC 16 is replaced in MBC/C 34 by Multiplexer (MUX) 38, which receives parallel inputs from MMRD busses 22-1 and 22-1 and provides a one word wide output on MMRD bus 22 to MBC/C 34's DIRD 32. The output of MBC/C 34's DIRD 32 is in turn connect to CPD bus 24 to CPU 14. As just described, each MMAD provided to MM 12 by MAT 36 will result in a pair of words appearing in parallel to MMRD busses 22-1 and 22-2, that is, at the inputs of MUX 38. MUX 38 is responsive to a MUX Address (MUXA) provided from MAT 36 in conjunction with each MMAD to select and transfer to MMRD 22 the single word referenced by the corresponding CPAD. The single words are then transferred by DIRD 32 to single word data path CPD 24 to CPU 14.

Referring now to the parallel cache data path, as shown in FIG. 2 MBC/C 34 includes a CACHE 40 connected in parallel with MUX 38 and DIRD 32. CACHE 40 has a two word wide data input path comprised of two parallel single word paths connected from MMRD 22-1 and 22-2 in parallel with the corresponding inputs to MUX 38. CACHE 40 has a single word wide output path connected to CPD 24 in logical OR configuration with the output of DIRD 32, so that the output of MBC/C 34 upon CPD 24 is the logical OR function of the outputs of DIRD 32 and CACHE 40, that is, so that the output of MBC/C 34 upon CPD 24 is comprised of either the output of DIRD 32 or the output of CACHE 40.

Each CPAD address provided to MBC/C 34 by CPU 14 is, in MBC/C 34, provided as a CACHE Input Address (CAD) to MBC/C 34's cache mechanism. If the addressed word is presently resident in CACHE 40, CACHE 40 responds by providing to MAT 36 by an appropriate Hit/Miss (H/M) indication. MAT 36 responds to a cache hit by inhibiting the transfer of a MMAD to MM 12 and CACHE 40 responds to the CAD by providing the requested word on CACHE 40's output to CPD 24 and thus to CPU 14.

If the requested word is not presently in CACHE 40, the CPAD is translated into an odd/even word pair MMAD to MM 12 and the requested word and its' associated pair word are read from MM 12 to MBC/C 34. The requested single word is transferred directly to CPU 14 through the direct data path comprised of MUX 38, DIRD 32 and and CPD bus 24. The words of the pair are concurrently read into and stored in CACHE 40. Read requests by CPU 14 will thereby result in the transfer to CACHE 40 of additional words, beyond those immediately required by CPU 14, to be held in CACHE 40 in anticipation of the requirements of CPU 14. In a further preferred embodiment, the CACHE 40 is implemented with the capability, as well known in the art, to use memory access cycles not otherwise required by CPU 14 to read and store yet further information from MM 12 in anticipation of the requirements of CPU 14.

As regards write operations from CPU 14 to MM 12 in the cache configuration, it should be noted that the write data path remains, in the present embodiment, as in the non-cache configuration. That is, MMWD buses 26-1 and 26-2 are connected in parallel from MMWD bus 26 to comprise a single word path into the MB 28s of MM 12. Words are written into single odd or even address locations in MM 12 by operation of MAT 36 which, during write operations, steers a write enable command to the appropriate odd address or even address in MB 28s. In an alternate embodiment, however, the write data path may be increased to multiple words in width to allow the concurrent writing of a corresponding number of words if CPU 14 has the capability of writing multiple words or is modified to do so.

The replacement of MBC 16 by MBC/C 34 thereby results in the enhancement of the data transfer rate between MM 12 and CPU 14 without requiring modification to or rebuilding of the remainder of the system, in particular MM 12 and CPU 14. This enhancement results from the effective doubling of the width of the data path from MM 12 to CPU with a corresponding increase in the data transfer rate and the inclusion, without system modification, of a cache mechanism with again a corresponding enhancement in data transfer rate. MBC/C 34 accomplishes this enhancement by reconfiguring MM 12 from a single word wide by $2 \times N$ word deep memory to a two word wide by N word deep memory and by providing a cache data path in parallel with the previously existing direct data path.

The present invention may be embodied in yet other specific forms without departing from the spirit or essential characteristics thereof. For example, the dimensions of MBs 28 may differ from the example presented herein, or the width of the words used by the system may differ. In addition, it is not necessary for all MB 28 pairs in the cache configuration to comprise an actual pair; that is, one or more 'pairs' may include only one MB 28 and that portion of MM 12 will appear, in the cache configuration, as a single word wide memory. In yet a further embodiment, MM 12 may be configured in the cache configuration as three, four or more words wide, rather than two, with a consequent multiplication MMRD busses 22. Also, each MB 28 may be a multiple number of words wide with a corresponding increase in the width of the data paths and a corresponding increase in the number of words read from or written into each MB 28 in each read or write operation. In a still further embodiment, the write data path from CPU 14 to MM 12 may be increased in width to allow the concurrent writing of multiple words into MM 12. In yet another embodiment, the direct and cache output data paths may be increased in width corresponding to the increase in width of the reconfigured memory, thereby reconfiguring the entire system from, for example, an 8 bit word system to for example, a 16 or 32 bit word system. Thus, the present embodiments are to be considered in all respects as illustrative and not restrictive, the scope of the invention being indicated by the appended claims rather than by the foregoing description, and all changes which come within the meaning range of equivalency of the claims are therefore intended to be embraced therein.

What is claimed is:

1. In a memory means for a data processing system, the data processing system including means for generating first addresses corresponding to data to be read from the memory means and the memory means including a plurality M of memory bank means having separate data output paths and wherein the memory bank means data output paths are configured into a single one bank wide direct output path and the memory bank means are addressed by the first addresses as a sequential one bank wide by M bank deep memory, means for reconfiguring the memory means, comprising:

means responsive to the first addresses for providing second corresponding addresses for addressing the memory bank means as a parallel M bank wide by single bank deep memory to read information from M bank locations in parallel, means for reconfiguring the memory bank means data output paths into M parallel bank output data paths, the bank output reconfiguring means responsive to the first addresses for selecting corresponding ones of the M parallel bank output data paths as a memory means output path, and cache means connected in parallel with the M parallel bank output data paths and the memory means output path and responsive to the second addresses for storing information appearing upon the non-selected ones of the M parallel bank output data paths for subsequent transfer to the memory means output path, the cache means being responsive to the subsequent first addresses for transferring to the memory means output path previously non-selected data stored in the cache means when the information specified by a present first address has been previously stored in the cache means.

2. In a memory means for a data processing system, the data processing system including means for generating first addresses corresponding to data to be read from the memory means and the memory means including a plurality M of memory bank means having separate data output paths and wherein the memory bank means data output paths are configured into a single one bank wide direct output path and the memory bank means are addressed by the first addresses as a sequential one bank wide by M bank deep memory, a method for reconfiguring the memory means, comprising the steps of:

reconfiguring the memory bank means data output paths into M parallel output data paths, providing second addresses corresponding to the first addresses for addressing the memory bank means as a parallel M bank wide by single bank deep memory to read information from M bank locations in parallel, responsive to the first addresses, selecting certain ones of the M parallel output data paths as a memory means output path, connecting in parallel with the M parallel output data paths and the memory means output path a cache means, responsive to the second addresses, storing information appearing upon the non-selected ones of the M parallel output data paths in the cache means, and responsive to subsequent first addresses transferring to the memory means output path previously non-selected data stored in the cache means when the information specified by a present first address has been previously stored in the cache means.

3. In a memory means for a data processsing system, the data processing system including means for generating first addresses corresponding to data to be read from the memory means and the memory means including a plurality M of memory bank means having separate data output paths and wherein the memory bank means data output paths are configured into a single one bank wide direct output path and the memory bank means are addressed by the first addresses as sequential one bank wide by M bank deep memory, means for enhancing the rate at which information may be read from the memory means, comprising:

means responsive to the first addresses for providing second corresponding addresses for addressing the memory bank means as a parallel M bank wide by single bank deep memory to read information from M bank locations in parallel, means for reconfiguring the memory bank means data output paths into M parallel bank output data paths, the bank output reconfiguring means responsive to the first addresses for selecting certain ones of the M parallel bank output data paths as a memory means output path, and cache means connected in parallel with the M parallel bank output data paths and the memory means output and responsive to the second addresses for storing information appearing upon the non-selected M parallel bank output data paths for subsequent transfer to the memory means output path, the cache means being responsive to subsequent first addresses for transferring to the memory means output path previously non-selected data stored in the cache means when the information specified by a present first address has been previously stored in the cache means.

4. In a memory means for a data processing system, the memory means including a plurality M of memory bank means having separate data output paths and wherein the memory bank means data output paths are configured into a single one bank wide direct output path and the memory bank means are addressed by first addresses as a sequential one bank wide by M bank deep memory, a method for enhancing the rate at which information may be read from the memory means, comprising the steps of:

reconfiguring the memory bank means data output paths into M parallel bank output data paths, providing second addresses corresponding to the first addresses for addressing the memory bank means as a parallel M bank wide by single bank deep memory to read information from M bank locations in parallel, responsive to the first addresses, selecting certain ones of the M parallel bank output data paths as a memory means output path, connecting in parallel with the M parallel bank output data paths and the memory means output path a cache means, responsive to the second addresses, storing information appearing upon non-selected ones of the M parallel bank output data paths in the cache means, and responsive to subsequent first addresses transferring to the memory means output path previously non-selected data stored in the cache means when the information specified by a present first address has been previously stored in the cache means.

5. In a data processing system, including processor means and memory means and memory control means for conducting information between the memory means and the processor means, the memory means including a plurality M of memory bank means having separate data output paths and the memory control means including first addressing means for providing first addresses for addressing the memory bank means as a sequential one bank wide by M bank deep memory for reading information from single bank locations and first bus configuration means for configuring the memory bank means data output paths into a single one bank wide direct memory output path for conducting the information to the processor means, memory reconfiguration means, comprising:

address translation means replacing the first addressing means for providing second addresses for addressing the memory bank means as a parallel M bank wide by single bank deep memory for reading information from M bank locations in parallel, and bus reconfiguration means replacing the first bus configuration means for configuring the memory bank means data output paths into M parallel bank output data paths and including means responsive to the first addresses for connecting selected ones of the parallel bank output paths to the direct memory output path and cache means responsive to the address translation means and having M input paths connected from the memory bank M parallel bank output data paths and a one bank wide cache output path connected to the direct memory output path for storing information read from the memory bank means in response to a present second address and when information specified by a present first address has been previously stored in the cache means, providing the information to the processor means.

6. In a data processing system, including processor means and memory means and memory control means for conducting information between the memory means and the processor means, the memory means including a plurality M of memory bank means having separate data output paths, and the memory control means including first addressing means for providing first addresses for addressing the memory bank means as a sequential one bank wide by M bank deep memory for reading information from single bank locations and first bus configuration means for configuring the memory bank means data output paths into a single one bank wide direct memory output path for conducting the information to the processor means, a method for reconfiguring the memory means, comprising the steps of:

replacing the first addressing means with address translation means for addressing the memory bank means as a parallel M bank wide by single bank deep memory for reading information from M bank locations in parallel, replacing the first bus configuration means with bus reconfiguration means for configuring the memory bank means data output paths into M parallel bank output data paths and including means responsive to the address translation means for connecting selected ones of the M parallel bank output data paths to the direct memory output path, and connecting in parallel with the bus reconfiguration means a cache means responsive to the address translation means and having M input paths connected from the M parallel bank output data paths and a one bank wide cache output path connected to the direct memory output path for storing information read from the memory bank means in response to a present second address and when information specified by a present first address has been previously stored in the cache means, providing the information to the processor means.

7. In a data processing system including processor means and memory means, the data processing system including means for generating first addresses corresponding to data to be read from the memory means and the memory means including a plurality M of memory bank means having separate data output paths, memory control means for conducting information between the memory means and the processor means, comprising:

in a first selectable configuration, first addressing means responsive to the first addresses for addressing the memory bank means as a sequential one bank wide by M bank deep memory for reading information from single bank locations, and first bus configuration means for configuring the memory bank means data output paths into a single one bank wide direct memory output path for conducting the information corresponding to the first addresses to the processor means, and in a second selectable configuration, second addressing means responsive to the first addresses for providing second addresses for addressing the memory bank means as a parallel M bank wide by single bank deep memory for reading information from M bank locations in parallel, second bus configuration means for configuring the memory bank means data output paths into M parallel bank output data paths and including means responsive to the second addressing means for connecting selected ones of the M parallel bank output data paths corresponding to the first addresses to the direct memory output paths, and a cache means responsive to the second addressing means and having M input paths connected from the M parallel bank output data paths and a one bank wide cache output path connected to the direct memory output path for storing information read from the memory bank means in response to a present second address and when information specified by a present first address has been previously stored in the cache means, providing the information to the processor means.

8. A memory means for a data processing system, the data processing system including means for generating first addresses corresponding to data to be read from the memory means, comprising:

a plurality M of memory bank means having separate data output paths, wherein the memory bank means data output paths are configured into a single one bank wide direct output path and the memory bank means are addressable by the first addresses as a sequential one bank wide by M bank deep memory, means for reconfiguring the memory means, including means responsive to first address for providing second corresponding addresses for addressing the memory bank means as a parallel M bank wide by single bank deep memory to read information from M bank locations in parallel, and means for reconfiguring the memory bank means data output paths into M parallel bank output data paths, the bank output reconfiguring means responsive to the first addresses for selecting corresponding ones of the parallel bank output paths as a memory means output path, and cache means connected in parallel with the M parallel bank output data paths and the memory means output path for storing information appearing upon the non-selected parallel bank output path for subsequent transfer to the memory means output path in response to subsequent first addresses when the information specified by a present first address has been previously stored in the cache means.

\* \* \* \* \*